July 15, 1969   J. F. KOPCZYNSKI   3,456,184
FLUID DISPLACEMENT DEVICE AND MEANS TO SUBJECT
SAID FLUID TO A MAGNETIC FIELD
Filed Jan. 20, 1964   3 Sheets-Sheet 2

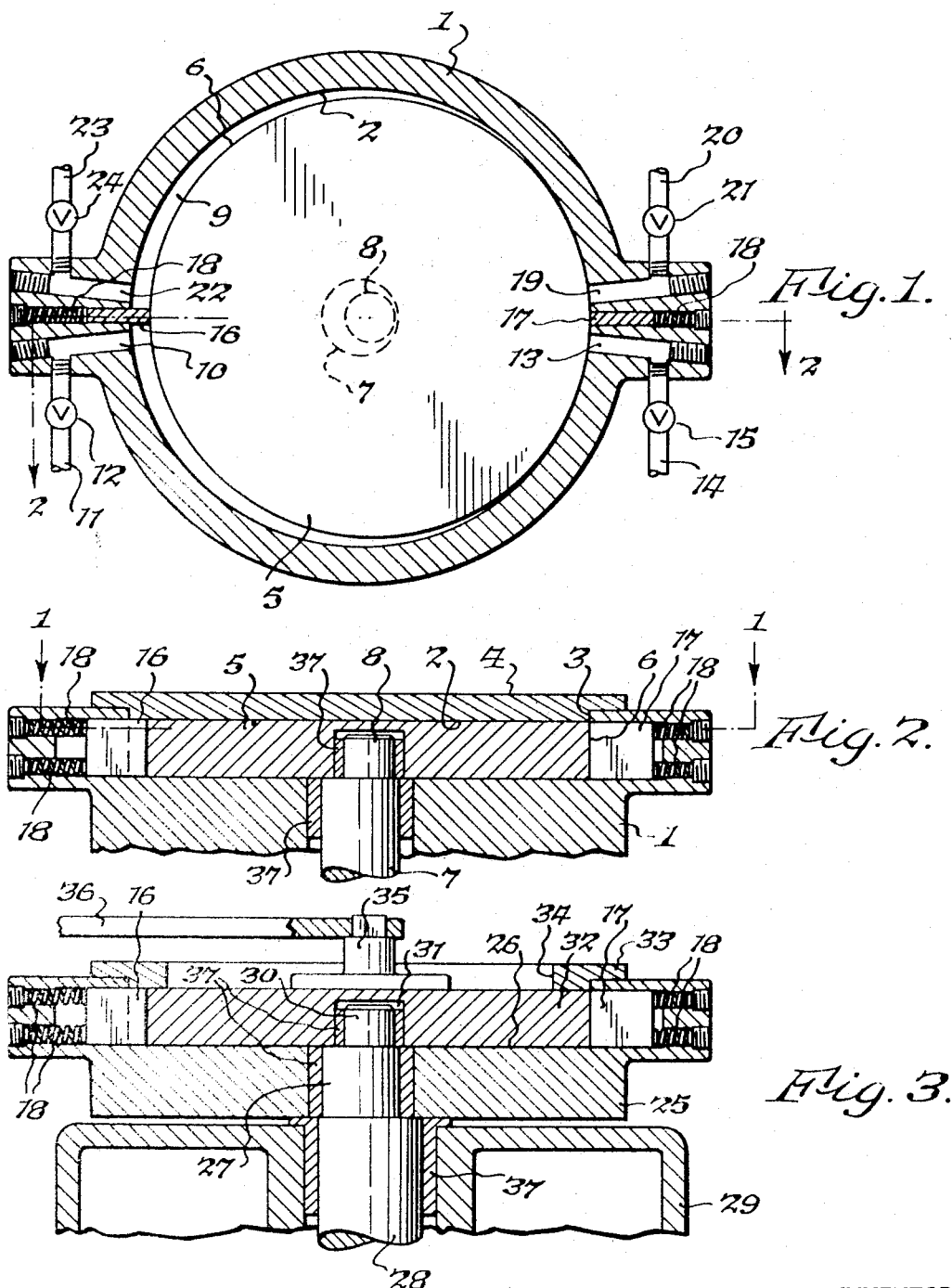

INVENTOR.
John F. Kopczynski

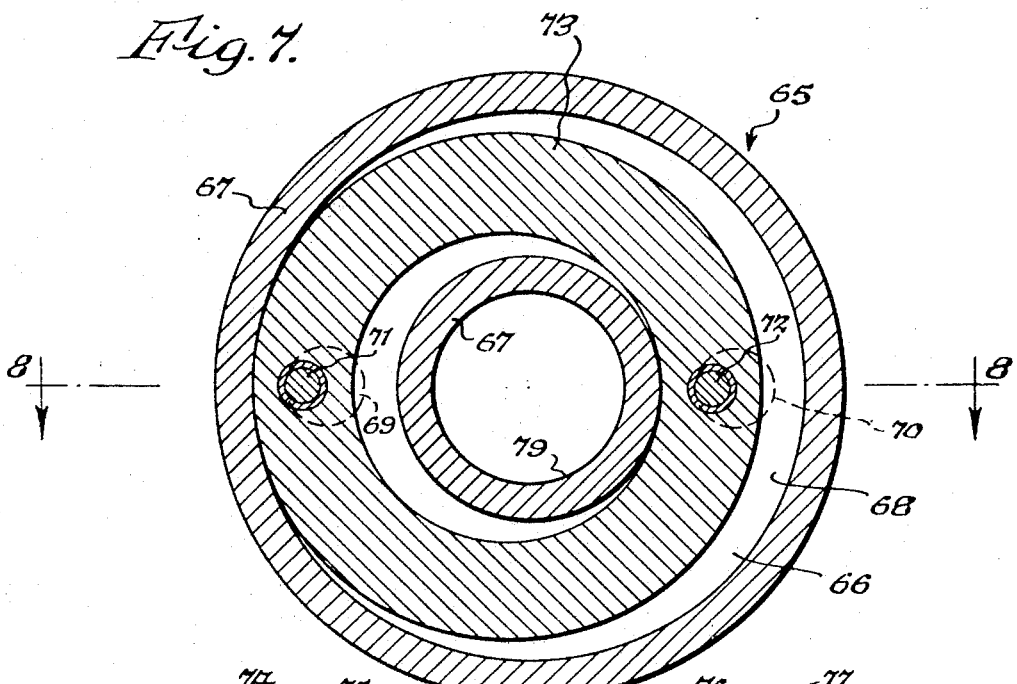
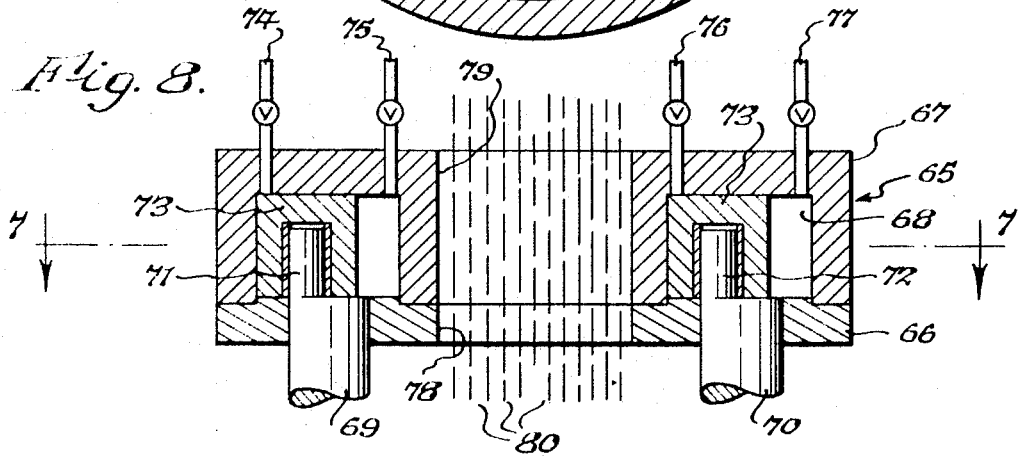

****

United States Patent Office 3,456,184
Patented July 15, 1969

3,456,184
FLUID DISPLACEMENT DEVICE AND MEANS TO SUBJECT SAID FLUID TO A MAGNETIC FIELD
John F. Kopczynski, 1671 Sweeney St., North Tonawanda, N.Y. 14120
Filed Jan. 20, 1964, Ser. No. 338,916
Int. Cl. G01r 33/08
U.S. Cl. 324—34                                 2 Claims

ABSTRACT OF THE DISCLOSURE

A fluid displacement device for subjecting fluids to high linear velocities consisting of a housing having a first circular wall, an element in said housing and having a second circular wall of less diameter than said first circular wall with a portion thereof in contact with the first circular wall, a space between the first and second circular walls, means for gyrating the element in the housing to cause the space between said first and second walls to move rapidly in a circular motion due to the said gyration, conduit means for conducting fluid into said space, and a central passage in said housing for permitting magnetic flux to be located in proximity to said moving fluid in said space so that the effect of said magnetic flux on said fluid in said chamber may be ascertained.

---

This invention relates to fluid displacement devices capable of subjecting fluids, and particularly gases, to high linear speeds and a magnetic field, to enable one to ascertain the effect of such high speeds upon such fluids.

An object of this invention is to provide a device which can receive and move at relatively high linear speeds, a fluid specimen to be tested, while the movable parts of such device are moving at relatively low speeds, with which the movement of such fluids may be as a stream or in closed loop paths, and which will be relatively simple, practical, compact and inexpensive.

Another object is to provide a device for moving a fluid specimen, such as an ionized gas, at high linear speeds in a closed loop path, and while so moving subjecting it to a magnetic flux, to ascertain the effects of said specimen on such flux and of said flux on said specimen, and which will be relatively simple and inexpensive.

Other objects and advantages will appear from the following description of some examples of the invention, and the novel features will be particularly pointed out in connection with the appended claims.

In the accompanying drawings:

FIG. 1 is a sectional plan of one device constructed in accordance with the invention, the section being taken approximately along the line 1—1 of FIG. 2;

FIG. 2 is a sectional elevation of the same, the section being taken approximately along the line 2—2 of FIG. 1;

FIG. 3 is a sectional elevation similar to FIG. 2 but illustrating a modification thereof;

FIG. 7 is a sectional plan of another example of the invention, the section being taken approximately along the line 7—7 of FIG. 8; and FIG. 8 is a sectional elevation of the same, the section being taken approximately along the line 8—8 of FIG. 7.

Figure 4:
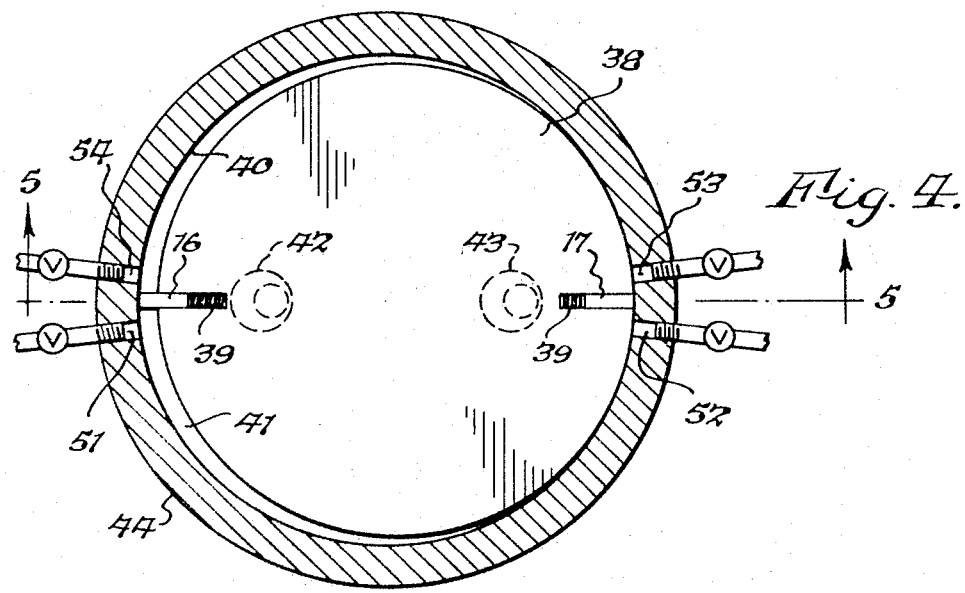
FIG. 4 is a sectional plan similar to FIG. 1 but employing different means for causing the relative gyrations of the elements, the section being taken approximately along the line 4—4 of FIG. 5.

In the example of the invention illustrated in FIGS. 1, and 2, a housing or element 1 has a chamber 2 with an open face 3 that is closed by a plate 4 that is secured to the housing by suitable means, not shown. This chamber 2 is a closed cylindrical chamber and within this chamber is another element 5 which is cylindrical in shape, with its diameter less than the diameter of the chamber 2 and its peripheral wall 6 of an axial length or height substantially equal to the axial length or height of the chamber 2, so that the element 5 may move in the chamber 2 with close clearance with the ends of the chamber. A shaft 7 is rotatable in the housing or element 1 and extends into the chamber 2 through an end wall thereof and axially with respect to the chamber 2. The end 8 of the shaft which is within the chamber 2 is reduced in diameter from that of the shaft and this reduced diameter end is eccentric to the axis of rotation of the shaft 7. The throw of this eccentric end 8 is equal to the difference in diameter of the chamber 2 and the element 5. When the shaft 7 is rotated from any source of power, not shown, its eccentric end 8 will cause the element 5 to gyrate in the chamber 2 and move the crescent shaped space 9 that exists between the peripheral wall 6 of element 5 and the peripheral wall of chamber 2, around the peripheral part of the chamber 2, once for each rotation of the shaft 7. Since the space 9 is radially at a substantial distance from the axis of shaft 7, the linear speed of travel of the space 9 for each rotation of the shaft will be very much greater than the linear speed of the shaft periphery. By increasing the diameter of the chamber 2, the linear speed of the space 9 for each rotation of the shaft 7 may be greatly increased. Thus for any given speed of rotation of shaft 7, the linear speed of the space 9 may be made relatively high. When this space 9 is filled with a fluid, liquid or gaseous, it will be given a linear translation motion with the space 9 at a high rate.

The housing or element 1 has an inlet port 10 that opens through the peripheral wall of chamber 2, and a pipe 11 having therein a controlling valve 12 is connected to the port 10 for supplying a fluid specimen to the space 9. An exit or exhaust port 13 opens outwardly through the peripheral wall of chamber 2 at a point spaced well from port 10 and preferably nearly diametrically opposite from port 10. A pipe 14 having a controlling valve 15 therein is connected to the outlet port 13. The housing or element 1 is provided with vanes 16 and 17 at diametrically disposed sides of chamber 2 that move radially of the chamber 2 into riding contact against the peripheral wall 6 of element 5. Springs 18 behind each vane urge the vane yieldingly against the element 1 so that each vane will ride continuously against the peripheral wall of element 1 as shaft 7 rotates and element 1 gyrates in the chamber 2. The port 10 is adjacent, and at one side of, the vane 16 and the port 13 is adjacent the vane 17 but at the same side as the port 10. An inlet port 19 is provided for chamber 2 at the opposite side of, but adjacent to, the vane 17, and a pipe 20 having therein a controlling valve 21 is connected to the port 19. The housing 1 has an outlet port 22 adjacent to vane 16 but at the opposite side thereof from the port 10, and a pipe 23 with a controlling valve 24 therein is connected to port 22.

By connecting pipes 11 and 20 to a source of fluid and pipes 14 and 23 to a delivering container, and opening of all valves 12, 15, 21 and 24, when the shaft 7 rotates it will cause the space 9 to move around and draw fluid in through pipe 11 and expell it through pipe 14 and also draw fluid in through pipe 20 and expell it through pipe 23, all at high linear speeds while in the space 9.

In the example of the invention shown in FIGS. 1 and 2, the housing 1 was stationary and the inner element 5 was gyrated. In FIG. 3 the action is the same as for FIG. 2 except that the inner element is stationary and the housing with the chamber is gyrated. In FIG. 3 the housing or element 25 having the cylindrical chamber 26 is rotatably mounted on the eccentric portion 27 of the drive shaft 28. The shaft is rotatably mounted in a support 29 and beyond the eccentric portion 27 is a reduced end 30 which is concentric with the axis of the shaft, and rotatably received in a central recess 31 of the other element 32. The top plate 33 of the element 25 has a central aperture 34. A boss 35 is secured to the central portion of the face of element 32 which is exposed through aperture 34 of the cover and a stationary arm 36 is removably fixed to this boss to hold the boss and the element 32 from rotation. Vanes 16 and 17 correspond to vanes so identified in FIGS. 1 and 2 and are resiliently urged by springs 18 into riding contact with the peripheral wall of element 32 for the full axial length or height of that wall. In both examples in FIGS. 1–3, the bearings for the shafts 7 and 28 all have low friction bearing liners 37.

Figure 5:
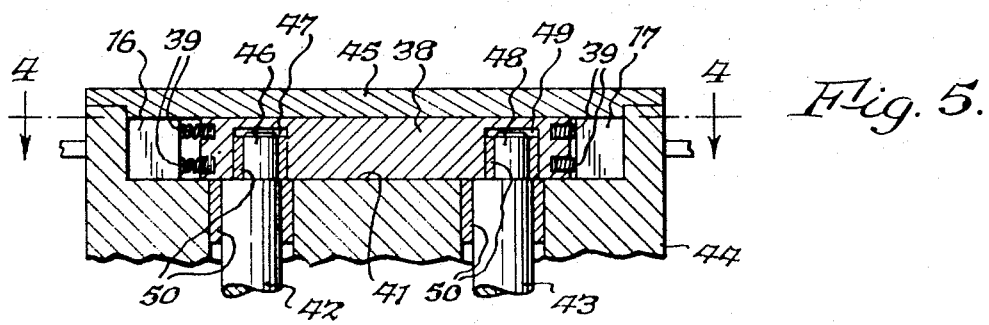
FIG. 5 is a sectional elevation of the same, the section being taken approximately along the line 5—5 of FIG. 4.

In the example of the invention shown in FIGS. 4 and 5, the device functions generally the same as for FIGS. 1 and 2, except that the vanes 16 and 17 are provided in the inner element 38 and are resiliently urged by springs 39 into riding contact with the peripheral wall 40 of the chamber 41, and there are two shafts 42 and 43 which are rotatably mounted side by side but spaced apart in the housing or element 44. A cover plate 45 corresponding to cover plate 4 of FIGS. 1 and 2 is provided on the housing 44 to close the chamber 41. The shaft 42 has an eccentric end 46 that is rotatably received in and fits a recess 47 in the gyrating element 38, and shaft 43 has an eccentric end 48 which is rotatably received in and fits a recess 49 in the gyrating element 38. Low friction bearing liners 50 are provided for the shafts 42 and 43. A valve controlled inlet port 51 opens into chamber 41, and a valve controlled outlet port 52 opens out of the chamber nearly opposite from the inlet port 51 as do ports 10 and 13 of FIGS. 1 and 2. A valve controlled inlet port 53 opens into the chamber 41 near to but spaced from exit port 52, and a valve controlled exit port 54 opens into chamber 41 near to but spaced from the inlet port 51. The two shafts 42 and 43 are geared together by means, not shown, which causes the shafts to rotate in unison with their eccentric ends similarly arranged as shown, so that they cause gyrations of the inner element, as in FIGS. 1 and 2. This example functions in the manner explained for FIGS. 1 and 2.

Figure 6:
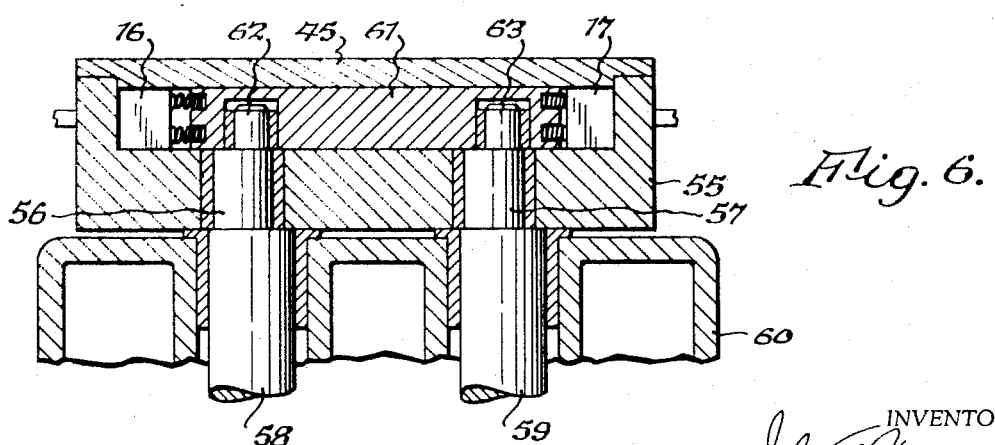
FIG. 6 is an elevation similar to FIG. 5, but illustrating a modification thereof.

In the example illustrated in FIG. 6, the construction is similar to that explained for FIGS. 4 and 5 except that the housing element 55 is mounted on the eccentric portions 56 and 57, respectively, of shafts 58 and 59 which are rotatably mounted in support 60, and the inner element 61 is mounted on concentric ends 62 and 63 of the shafts 58 and 59, respectively. The two shaft ends 62 and 63 keep the element 61 stationary, and the housing 55 is gyrated about element 61 when the shafts 58 and 59 are rotated. The vanes 16 and 17 are provided in the stationary element 61 and spring pressed against the peripheral wall 64 of the chamber of the housing element 55, as in FIGS. 4 and 5. The operation is the same as explained for FIGS. 4 and 5.

In the example of the invention shown in FIGS. 7 and 8, the housing element 65 is formed of a base plate 66 and an inverted cover 67, which latter is annular in shape and rests upon and is coupled to base plate 66 to provide an annular working chamber 68. Shafts 69 and 70 are rotatable in and extend through the base plate 66 and terminate in the annular chamber 68 at opposite sides thereof. These shafts are geared to rotate together at the same speeds. The ends 71 and 72 of shafts 69 and 70 respectively which are within the annular chamber 68 are eccentric to the axes of the shafts and are rotatably received in recesses in an annular ring 73. This ring 73 has an axial length substantially equal to the axial length of the chamber 68 so as to have close clearance with the ends of the chamber. The outer diameter of the ring 73 is less than the outer diameter of the chamber 68 and the inner diameter of the ring 73 is greater than the inner diameter of the chamber 68, so that the ring can shift and gyrate in the chamber 68. Since the eccentric ends of the shafts 69 and 70 are rotatably received in the ring at opposite sides of the chamber, when the shafts 69 and 70 rotate in unison and have their throws similar, the ring 73 will be gyrated in the chamber 68.

Valve controlled pipes 74, 75, 76, and 77 open into the chamber 68 through the cover 67 at opposite sides of the chamber, two of the pipes 74 and 75 opening into the chamber adjacent the inner and outer margins at one side of the chamber, and the other two pipes 76 and 77 open into the opposite side of the chamber adjacent the inner and outer margins of the chamber at that side thereof. It will be noted that there are two crescent shaped spaces in the annular chamber 68, separated by the ring 73 and disposed at opposite sides. By operation of the valves in the pipes 74, 75, 76 and 77, these two crescent shaped spaces may be filled with charges of a fluid specimen under study, and when the ring 73 is caused to gyrate in the chamber 68, these two fluid charges will be caused to spin around the chamber 68 at high linear speeds for moderate rotary speeds of the shafts 69 and 70 and the ring 73.

The plate 66 has a circular aperture 78 aligned with and of the same diameter as the inner diameter of the annular cover 67 so as to provide a passage 79 through the housing 65. A magnetic flux, indicated schematically by the dash lines 80 may be conducted through this passage 79, from a source, not shown, and which may be varied in intensity to subject the spinning charges of fluid in the spaces of chamber 68 to a variable magnetic field in order to learn the effect of the high linear speeds alone or combined with the magnetic field on the charges of fluid. After a test the fluid may be removed through selective operation of the valves in the pipes 74, 75, 76 and 77.

Assuming, for example, that the fluid charge is an ionized gas, such as hydrogen, the tendency of the high speed gas to create a magnetic field may be studied, and when a magnetic flux is passed through the passage 79, its effect on the fast moving gas can also be studied. It is postulated that magnetic fields of much greater magnitude than are currently obtainable for a reasonable length of time may be obtained by this apparatus using charges of ionized gases. It is postulated that with the ionized gases and magnetic field, one may generate electricity by moving certain gases through a magnetic field at ultra high speeds as for example, in the manner disclosed in any one of the U.S. patents to Borger 1,196,511; Eliott 1,509,103; Lindley et al. 3,281,614; Fleming 2,607,223 and Fuhs 3,262,052. The illustrated examples of this invention are useful devices for studying the movement of fluids, and particularly gases, at ultra high speeds, alone or in connection with a magnetic field.

It will be understood that various changes in the details, materials and arrangements of parts, which have been herein described and illustrated in order to explain the nature of the invention may be made by those skilled in the art within the principle and scope of the invention as expressed in the appended claims.

I claim:
1. A fluid displacement device for subjecting fluids to high linear velocities comprising a first element defining a closed chamber with a first circular periphery, a second element disposed within said chamber and having a second circular periphery of less diameter than the diameter of said chamber and an axial length substantially equal to the axial length of said chamber, a portion of said second periphery being in contact with said first periphery, a pair of shafts, means rotatably mounting said shafts in said first element, said shafts being spaced apart in side-by-side relationship and terminating in said second element, eccentric ends on said shafts rotatably mounted in said second element for causing relative gyratory movement between said first and second elements with said gyratory movement having a throw approximately equal to the difference between the diameter of said chamber and the diameter of said second element, valve controlled spaced apart inlet and outlet ports, located within said first element, opening into said chamber by which the space in said chamber between said first and second elements may be filled with a fluid to be subjected to said high linear speeds, said first and second elements being annular in shape and said chamber being annular, a central aperture formed by the center of the first annular element passing completely through said displacement device for permitting a magnetic flux to pass through said central aperture while said chamber is filled with said fluid and while said elements experience said relative gyration, and a source of magnetic flux adjacent said aperture to pass magnetic flux therethrough, whereby the effect of said magnetic flux on said fluid in said chamber may be ascertained.

2. A fluid displacement device for subjecting a fluid to high linear velocities by relatively low speed actuating means comprising a first annular element having an inner annular wall and an outer annular wall defining an annular chamber, a second annular element disposed in said chamber and having a circular outer periphery of less diameter than the diameter of said chamber as defined by said outer annular wall and having a circular inner periphery which is of greater diameter than said inner annular wall with a portion of said outer periphery being in contact with a portion of said outer annular wall and a portion of said inner periphery being in contact with a portion of said inner annular wall, a first space between said outer annular wall and said outer periphery, a second space between said inner annular wall and said inner periphery, said second element having an axial length substantially equal to the axial length of said chamber, means for causing relative gyratory movement between said first and second annular elements with said gyratory movement having a throw approximately equal to the difference in the diameters of said chamber as defined by said outer annular wall and said circular outer periphery of said second element, said first element having valve controlled inlet and outlet ports opening into said first and second spaces in said chamber between said first and second elements, whereby both of said spaces in said chambers may be filled with fluids to be subjected to high speeds and, by said relative gyrations of said elements, subjected to high linear speeds, a central aperture formed by the center of said inner annular wall passing completely through said displacement device, and a source of magnetic flux adjacent said aperture to pass magnetic flux therethrough.

References Cited

UNITED STATES PATENTS

| | | | |
|---|---|---|---|
| 3,148,626 | 9/1964 | Smith | 103—131 |
| 940,817 | 11/1909 | McLean et al. | 103—131 X |
| 1,196,511 | 8/1916 | Borger | 310—11 |
| 1,509,103 | 9/1924 | Elliott | 310—11 |
| 2,246,272 | 6/1941 | Davidson | 230—146 |
| 2,423,507 | 7/1947 | Lawton | 103—132 |
| 2,607,223 | 8/1952 | Fleming | 310—11 X |
| 2,779,917 | 1/1957 | De Boisblane | 324—40 |
| 3,249,869 | 5/1966 | Meyer et al. | 324—40 |
| 3,260,867 | 7/1966 | Hurwitz et al. | 310—11 |
| 3,262,052 | 7/1966 | Fubs | 324—34 |
| 3,281,614 | 10/1966 | Lindley et al. | 310—11 |

RUDOLPH V. ROLINEC, Primary Examiner

R. J. CORCORAN, Assistant Examiner

U.S. Cl. X.R.

103—131; 230—146